T. HAGERTY.
Combined Ice-Pick and Can-Opener.

No. 165,729. Patented July 20, 1875.

WITNESSES:
P. C. Dieterich
H. O. Scott

INVENTOR:
Thos. Hagerty
per C. H. Watson & Co.
ATTORNEYS

UNITED STATES PATENT OFFICE.

THOMAS HAGERTY, OF NEW YORK, N. Y., ASSIGNOR TO SAMUEL ROTHSCHILD, JR., OF SAME PLACE.

IMPROVEMENT IN COMBINED ICE-PICKS AND CAN-OPENERS.

Specification forming part of Letters Patent No. 165,729, dated July 20, 1875; application filed July 7, 1875.

*To all whom it may concern:*

Be it known that I, THOMAS HAGERTY, of the city of New York, in the county of New York and State of New York, have invented certain new and useful Improvements in Combined Ice-Picks and Can-Opener; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction of an ice-pick, and also in combining therewith a pin and a cutter, so as to use the tool as a can-opener.

Figure 1:
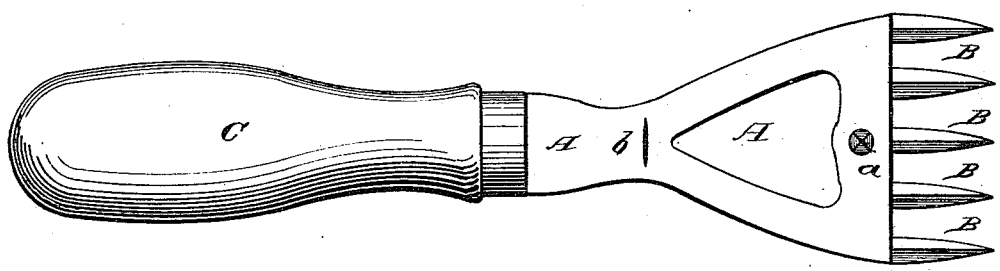
Figure 2:
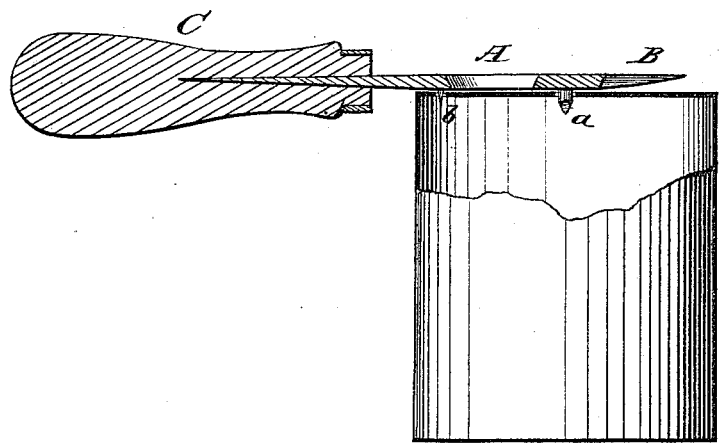

In the annexed drawing, Figure 1 is a plan view, and Fig. 2 is a longitudinal section, of an implement embodying my invention.

A represents the frame of the tool, made in triangular form, and provided on the front side with a series of V-shaped teeth or picks, B. The corner where the sides of the frame intersect is extended out into a tapering tang, to receive a wooden handle, C. The flat sides of the teeth B are on a line with the back of the frame, and have their edges taper from their points to about half their lengths, and from thence they run straight to where they are united to the frame. From the center of the frame A the metal is removed, as shown, so as to make the tool light. On the front side of the frame, in rear of the center pick, a center-pin, $a$, is formed, and at the point near the handle where the sides intersect, and on a line with the pin $a$, is affixed a knife or cutter, $b$, made in half-circular form, and having its edge projecting from the frame about one-eighth of an inch, more or less.

The tool is preferably made of malleable iron, case-hardened, and tinned.

The operation of the pick is the same as all ordinary ice-picks; but, having a series of teeth or picks flat on one side, the ice is more easily cut than with the usual picks.

To operate the can-opener the center-pin $a$ is punched through the center of the can-top, while the knife describes a circle around its outer edge, cutting into and removing the top.

It will be seen by the peculiar construction of the knife or cutter that it does not hook under or wedge into the cut, but turns the burr down instead of up, thereby lessening the friction.

Having thus fully described my invention, what I claim as new, and desire to secure by Letters Patent, is—

As a new article of manufacture, the pick and can-opener herein described, consisting of the triangular frame A, the series of teeth or picks B, pin $a$, and cutter $b$, substantially as and for the purpose herein set forth.

In testimony that I claim the foregoing as my own I affix my signature in presence of two witnesses.

THOMAS HAGERTY.

Witnesses:
 JOHN THOMPSON,
 AMOS SULLIVAN.